(12) United States Patent
Mukoyama et al.

(10) Patent No.: US 9,008,739 B2
(45) Date of Patent: Apr. 14, 2015

(54) TERMINAL STRUCTURE OF SUPERCONDUCTING CABLE CONDUCTOR AND TERMINAL MEMBER USED THEREIN

(75) Inventors: Shinichi Mukoyama, Tokyo (JP); Tokui Yonemura, Chiba (JP); Shuka Yonemura, legal representative, Chiba (JP); Masashi Yagi, Tokyo (JP); Tomoya Nomura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 144 days.

(21) Appl. No.: 13/701,255

(22) PCT Filed: May 30, 2011

(86) PCT No.: PCT/JP2011/062356
§ 371 (c)(1),
(2), (4) Date: Nov. 30, 2012

(87) PCT Pub. No.: WO2011/152342
PCT Pub. Date: Dec. 8, 2011

(65) Prior Publication Data
US 2013/0102474 A1    Apr. 25, 2013

(30) Foreign Application Priority Data
May 31, 2010   (JP) .................................. 2010-124190

(51) Int. Cl.
*H01L 39/24* (2006.01)
*H02G 15/02* (2006.01)
(Continued)

(52) U.S. Cl.
CPC ................. *H02G 15/02* (2013.01); *H01R 4/68* (2013.01); *H01R 11/11* (2013.01); *H02G 15/34* (2013.01); *Y02E 40/648* (2013.01); *H01R 4/023* (2013.01); *H01R 13/562* (2013.01)

(58) Field of Classification Search
CPC ............ H01L 39/2474; H01L 39/2461; H01L 39/2464
See application file for complete search history.

(56) References Cited

U.S. PATENT DOCUMENTS

| 5,195,910 A | 3/1993 | Enomoto et al. |
| 2005/0142937 A1 | 6/2005 | Lin |

(Continued)

FOREIGN PATENT DOCUMENTS

| CN | 101064384 A | 10/2007 |
| EP | 0 313 186 A2 | 4/1989 |

(Continued)

OTHER PUBLICATIONS

Machine translation of JP2004-244246, Aug. 2004, pp. 1-11.*
(Continued)

*Primary Examiner* — Colleen Dunn
(74) *Attorney, Agent, or Firm* — Oblon, McClelland, Maier & Neustadt, L.L.P.

(57) ABSTRACT

In a terminal structure of a superconducting cable conductor, a terminal portion of the superconducting cable conductor is connected with a terminal member of a good conductor. The terminal portion includes a superconducting layer disposed on an outer periphery of a central support; and an insulating layer surrounding the superconducting layer. The insulating layer and the superconducting layer are partially removed to expose the central support and the superconducting layer in this order from an end of the superconducting cable conductor. The terminal member includes a metal sleeve which includes a first cylindrical portion whose inner surface is in close contact with an exposed portion of the central support; a second cylindrical portion which is soldered around an exposed portion of the superconducting layer; and a third cylindrical portion into which the insulating layer is inserted.

6 Claims, 9 Drawing Sheets

(51) Int. Cl.
*H01R 4/68* (2006.01)
*H02G 15/34* (2006.01)
*H01R 4/02* (2006.01)
*H01R 13/56* (2006.01)
*H01R 11/11* (2006.01)

(56) References Cited

U.S. PATENT DOCUMENTS

2006/0162951 A1* 7/2006 Ashibe et al. ............. 174/125.1
2007/0284130 A1* 12/2007 Lallouet et al. ............. 174/84 S
2010/0087101 A1 4/2010 Lallouet et al.

FOREIGN PATENT DOCUMENTS

| EP | 0 313 186 A3 | 4/1989 |
|---|---|---|
| EP | 1 841 011 A2 | 10/2007 |
| EP | 1 841 011 A3 | 10/2007 |
| JP | 9 161873 | 6/1997 |
| JP | 3069068 | 5/2000 |
| JP | 2004 87265 | 3/2004 |
| JP | 2004 241246 | 8/2004 |
| JP | 2005 251570 | 9/2005 |
| JP | 2007 273468 | 10/2007 |
| JP | 2009 136071 | 6/2009 |
| JP | 2010 50103 | 3/2010 |

OTHER PUBLICATIONS

International Preliminary Report on Patentability issued Dec. 4, 2012, in PCT/JP2011/062356 filed May 30, 2011 submitting English translation only.
International Preliminary Report on Patentability issued Jan. 8, 2013, in PCT/JP2011/062356 filed May 30, 2011 submitting English translation only.
Written Opinion issued Jun. 21, 2011 in PCT/JP2011/062356 filed May 30, 2011 with English language translation.
Extended European Search Report issued Nov. 12, 2013 in Patent Application No. 11789745.4.
International Search Report Issued Jun. 21, 2011 in PCT/JP11/62356 Filed May 30, 2011.
Japanese Office Action Issued Apr. 10, 2012 in JP 2012-503138(with English translation).
Combined Chinese Office Action and Search Report issued on Jul. 23, 2014, in Patent Application No. 201180026630.0 (with English translation).
Office Action issued Oct. 21, 2014 in European Patent Application No. 11789745.4-1801.

* cited by examiner

31

33a 36
36
33 36

TERMINAL STRUCTURE OF SUPERCONDUCTING CABLE CONDUCTOR AND TERMINAL MEMBER USED THEREIN

TECHNICAL FIELD

The present invention relates to a terminal structure of a superconducting cable conductor used in a superconducting power cable which transmits a large amount of electricity with low loss, and relates to a terminal member used therein. The invention is applicable to the technology of connecting a superconducting cable and a conductor with each other at a terminal or an intermediate connection point.

BACKGROUND ART

In a superconducting cable which transmits electricity with low loss, a superconducting tape is helically wound around a flexible core to form a conductor layer, so that the cable has flexibility. When a high current capacity is required, a multi-layered cable with an increased number of conductor layers is used to afford a high current transmission. Examples of the high-temperature superconducting tape include a Bi-based superconducting tape and a Y-based superconducting tape. These types of superconducting tape are widely used because they have high critical current and are readily formed into a long tape.

A practical method of manufacturing a superconducting cable conductor is now described. A cylindrical stranded-wire conductor is prepared as a central support. The stranded-wire conductor is formed of multiple flexible and high-conductive wires composed of, for example, elemental Cu, alloyed Cu, elemental Al, or alloyed Al. A superconducting tape, which is 4 mm in width and 0.2 mm in thickness, for example, is wound helically around the central support leaving no space to form a first layer. Another superconducting tape is then wound helically around the outer surface of the first layer leaving no space similarly to the first layer to form a second layer. Similarly, a third layer is further wound around the second layer. Thus, multiple layers are wound over the central support to form a multilayered conductor. Then, an insulator (insulating layer) is provided on the outer surface of the superconducting cable conductor. The insulating layer is made of multiple layers of craft paper, semi-synthetic paper or synthetic paper, with the thickness of the layers corresponding to voltage. Accordingly, the insulation breakdown is avoided even when a high voltage is applied to the conductor.

In order to transmit a current through the superconducting cable conductor, it is necessary to strip off an insulating layer to expose the superconducting layer so that the exposed layer is connected with a Cu electrode. Patent Document 1 discloses a method of electrically connecting a Cu electrode (terminal member) with superconducting layers. In this method, the outer surface of each superconducting layer is covered with solder so that the superconducting layers are connected with a Cu electrode. This method achieves a small and uniform connection resistance between each superconducting layer and the Cu electrode, thus enabling even current flow in each layer, and enabling low loss and stable current transmission.

Generally, high tensile stress is applied to the electrode and the superconducting cable conductor due to a thermal shrinkage of the superconducting cable and/or a tension during installation of the cable. The above-mentioned method involving connection of superconducting layers with solder may apply large force to the superconducting tape due to such tensile stress, which leads to mechanical damage of the superconducting tape. Additionally, when a ground fault or a short-circuiting occurs in an electric power system including a superconducting cable, a fault current that is ten times to several dozen times larger in magnitude than a normal current flows instantaneously inside the power system. In such a case, the fault current exceeding a current capacity of superconducting layers may lead to burning out the superconducting layers. In order to avoid this, a central support of superconducting cable conductor is made of Cu or Al stranded wires so that the fault current flows through the central support.

The terminals of a superconducting cable conductor should be designed taking into account of such faults during operations. Patent Document 2 discloses a terminal of a superconducting cable conductor as shown in FIGS. 7 and 8. In the terminal of the superconducting cable conductor, an insulating sheath 13 is removed to expose superconducting layers 12 (a first layer 12a and a second layer 12b) over a central support 11. Moreover, the insulating sheath 13 and the superconducting layers 12 of certain lengths are removed to further expose the central support 11. A metal sleeve 30 is composed of two adjacent portions 31 and 32. A first portion 31 of the metal sleeve 30 fits around the exposed portion of the central support 11, and a second portion 32 of the metal sleeve 30 is soldered around the exposed portion of the superconducting layers 12. This structure ensures high mechanical tensile strength and provides a terminal where the first portion 32 of the metal sleeve 30 is electrically connected to the central support 11 to allow the fault current to flow.

PRIOR ART DOCUMENTS

Patent Documents

Patent Document 1: Japanese Unexamined Patent Application Publication No. 2004-087265
Patent Document 2: Japanese Unexamined Patent Application Publication No. 2010-050103

DISCLOSURE OF INVENTION

Problems to be Solved by the Invention

According to Patent Document 2, the first portion 31 of the metal sleeve 30 is fitted around the exposed portion of the central support 11, and the second portion 32 of the metal sleeve 30 is soldered around the exposed portion of the superconducting layers 12 in the terminal. Unfortunately, however, this structure allows a gap to be formed between an edge 30a of the metal sleeve 30 and the insulating sheath 13.

This gap induces the following problems: The superconducting cable is locally bent at this gap position when a bending force is applied to the cable; and a wire rod which forms the superconducting layer is pulled out from the insulating sheath 13, resulting in applying extremely-high stress to the wire rod. A large bending angle or large tension may bend and/or cut the wire rod.

Meanwhile, the terminal structure of Patent Document 2 including the first portion and the second portion of the metal sleeve 130 has an advantage that it is tolerant to thermal shrinkage or tension of the superconducting cable 110 when the superconducting cable 110 is cooled, as shown in FIG. 9A.

No countermeasure however has been taken to thermal expansion of the superconducting cable 110 when the superconducting cable 110 is subjected to a heat cycle from an ultralow temperature to a room temperature. Thermal expansion of the cable 110 induces non-uniform stress distribution inside the cable 110, that is, induces stress concentration at a terminal connection region. This leads to buckling or fracture, as shown in FIG. 9B, in the terminal of the superconducting cable 130 and the terminal portion of the conductor of Patent Document 2, which has not been designed to bear such bending stress.

Accordingly, an object of the present invention is to provide a connection having high mechanical strength and low electrical connection resistance between a superconducting cable conductor and a terminal member.

Means for Solving Problems

The present invention provides a terminal structure of a superconducting cable conductor for connecting a terminal portion of the superconducting cable conductor with a terminal member of a good conductor, the terminal portion including: a superconducting layer disposed on an outer periphery of a central support; and an insulating layer surrounding the superconducting layer, wherein the insulating layer and the superconducting layer are partially removed to expose the central support and the superconducting layer in this order from an end of the superconducting cable conductor; and the terminal member including a metal sleeve covering the terminal portion, the metal sleeve including: a first cylindrical portion whose inner surface is in close contact with an exposed portion of the central support; a second cylindrical portion which is soldered around an exposed portion of the superconducting layer; and a third cylindrical portion into which the insulating layer is inserted.

According to the present invention, the metal sleeve includes the third cylindrical portion into which the insulating layer is inserted. Since the insulating layer and the metal sleeve do not form a space therebetween or are in close contact with each other, flexure hardly arises between the insulating layer and the metal sleeve; and the linear state can be maintained when a bending force is applied to a terminal portion of the superconducting cable conductor. Thus no flexure occurs at the boundary between the superconducting layers and the insulating layer in the present invention, whereas local flexure occurs at a boundary between exposed superconducting layers and an insulating layer of a conventional terminal. As a result, this portion does not suffer from damage, such as cutting of a wire, due to stress concentration or flexure of the superconducting layers. Thus the terminal structure is not only electrically reliable but also mechanically reliable in terms of tension and/or bending.

Further, even when the superconducting cable shrinks due to a low temperature or expands due to heat, the third cylindrical portion of the metal sleeve prevents flexure between the insulating layer and the metal sleeve, which makes the terminal structure reliable.

According to the present invention, since the inner surface of the first cylindrical portion of the metal sleeve is in close contact with the exposed portion of the central support, the first cylindrical portion restrains the motion of the central support, thus enhancing the mechanical strength of the connection portion.

Meanwhile, soldering between the superconducting layer and the metal sleeve also contributes to reduction in connection resistance and to a uniform distribution of the connection resistance, and thus achieves stable current flow with a small loss.

In the present invention, it is preferable that the insulating layer include a wound insulating tape; and a length of the third cylindrical portion be equal to or greater than a width of the insulating tape. This structure enables the insulating layer, which is formed of the wound insulating tape, to be restrained or fixed securely. More specifically, if the length of the third cylindrical portion, which covers the insulating layer, is less than the width of the insulating tape, the insulating tape may slip and come loose at the edge, leading to failure in fixation of the overall insulating layer. The structure of the present invention can prevent such problems.

In the present invention, it is preferable that the third cylindrical portion have a diameter-increasing portion where an inner diameter gradually increases towards an edge of the third cylindrical portion. Accordingly, the cable can bend gently along the internal curvature of the diameter-increasing portion when a bending stress is applied to the cable.

In the present invention, it is preferable that the third cylindrical portion have a slit structure; and a diameter of the third cylindrical portion be reduced while the third cylindrical portion contains the insulating layer of the superconducting cable therein, so that the third cylindrical portion comes into close contact with the insulating layer. Such a structure gives springiness to the third cylindrical portion, which achieves a firm contact of the inner surface of the third cylindrical portion with the insulating layer without any adhesive or applied compressive force.

In the present invention, it is preferable that the exposed portion of the superconducting layer include multiple sub-layers arranged in tiers in an order from an outermost sub-layer to an innermost sub-layer thereof. According to this structure, all the sub-layers of the superconducting layer can be soldered to be connected with the inner surface of the metal sleeve.

The metal sleeve of the present invention is preferably composed of at least one of elemental Cu, alloyed Cu, and alloyed Al, which have low electrical resistance and good processability.

The present invention provides a terminal member of a good conductor to be connected with a terminal portion of a superconducting cable conductor, the terminal member including: a metal sleeve mounted on the terminal portion, the metal sleeve including a first cylindrical portion, a second cylindrical portion, and a third cylindrical portion which have different inner diameters, wherein the first cylindrical portion has an inner diameter larger than an outer diameter of a central support of the superconducting cable conductor; the second cylindrical portion has an inner diameter larger than an outer diameter of a superconducting layer disposed on an outer periphery of the central support; and the third cylindrical portion has an inner diameter larger than an outer diameter of an insulating layer surrounding the superconducting layer.

The second cylindrical portion of the metal sleeve preferably has an opening through which low-melting-point metal is poured into the second cylindrical portion.

Effects of the Invention

The present invention provides a connection having high mechanical strength and low electrical connection resistance between a superconducting cable conductor and a terminal member.

EMBODIMENTS FOR CARRYING OUT THE INVENTION

Embodiments of the present invention will now be described in detail below with reference to FIGS. 1, 2, and 3.

Figure 1:
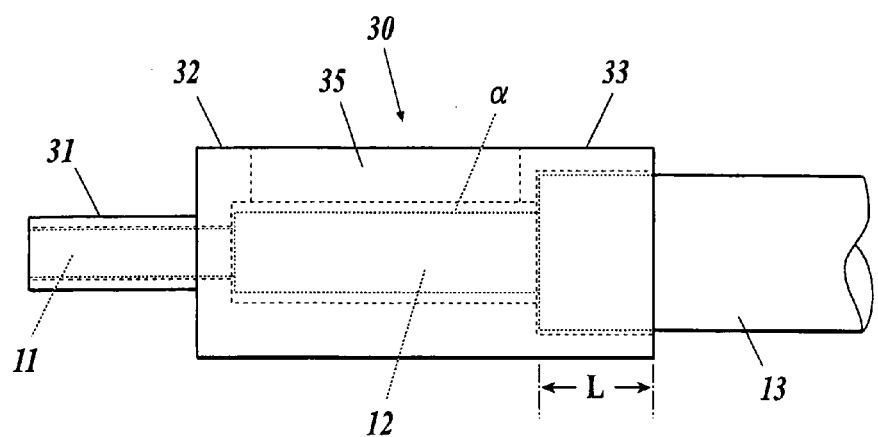
FIG. 1 is a side view of a terminal structure of a superconducting cable conductor according to a first embodiment of the present invention.
Figure 2:
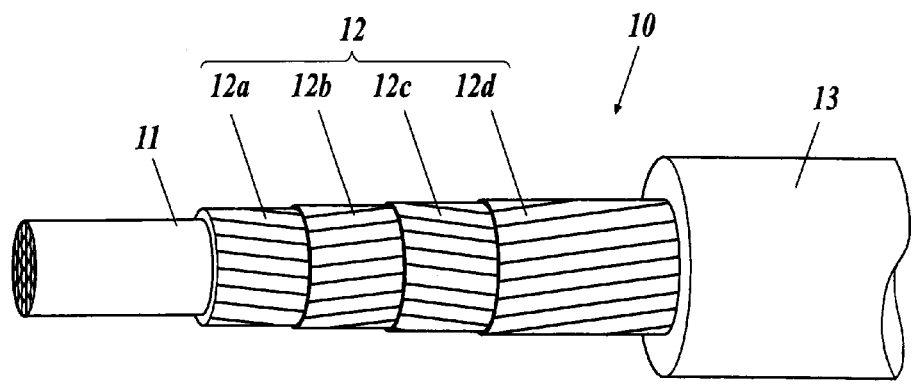
FIG. 2 is a perspective view of a terminal portion of a superconducting cable conductor according to the first embodiment of the present invention.
Figure 3A:
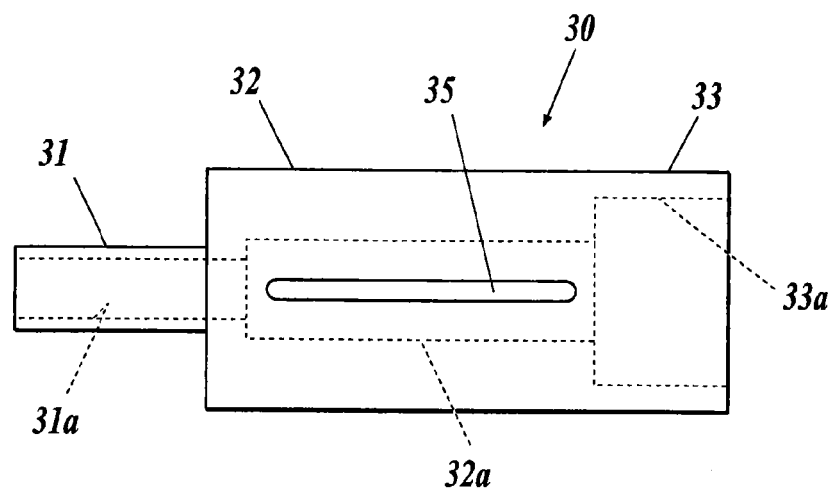
FIG. 3A is a plan view of a terminal member provided with a metal sleeve according to the first embodiment of the present invention.
Figure 3B:
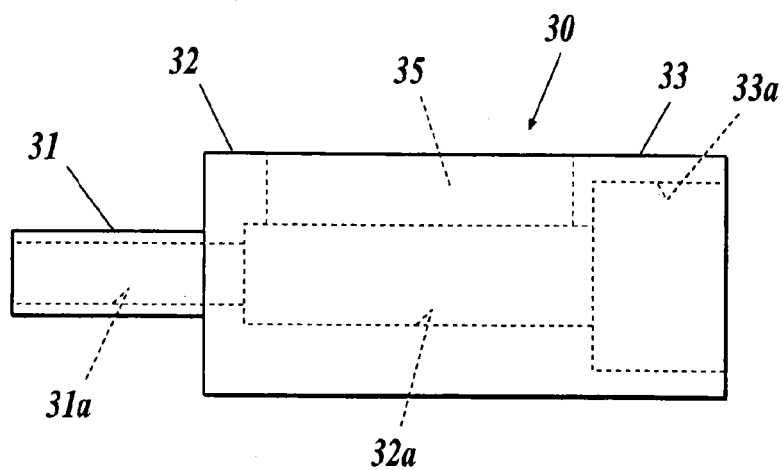
FIG. 3B is a side view of the terminal member provided with the metal sleeve according to the first embodiment of the present invention.
Figure 3C:
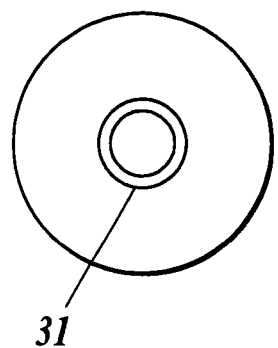
FIG. 3C is a left end view of the terminal member provided with the metal sleeve according to the first embodiment of the present invention.
Figure 3D:
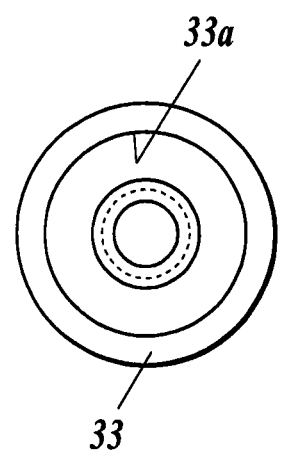
FIG. 3D is a right end view of the terminal member provided with the metal sleeve according to the first embodiment of the present invention.

FIG. 1 is a side view of a connection portion in a first embodiment where the present invention is applied to a multilayered superconducting cable.

First Embodiment

In the first embodiment, superconducting tapes are helically wound without gap around a central support 11 to form superconducting layers 12, and an insulating paper is wound over the outer surface of the superconducting layers 12 to form an insulating layer 13. Here, the central support 11 may be a conductor composed of a stranded wire of multiple Cu wires or Al wires. Alternatively, the central support 11 may be a hollow conductor composed of a spiral or flexible core tube with Cu or Al wires wound therearound. The superconducting tapes wound around the central support 11 may be a Bi-based or Y-based superconducting tape. In the present embodiment, Y-based superconducting tapes of 4 mm in width and 0.2 mm in thickness are wound to form the superconducting layers 12.

The insulating layer 13 is a wound tape of insulating paper or semi-synthetic paper of 20 mm in width and 0.1 mm in thickness. The thickness of the insulating layer 13 is about 6 mm for a 66-kV class superconducting cable, 15 mm for a 154-kV class superconducting cable, or 25 mm for a 275-kV class superconducting cable. The insulating paper may alternatively be craft paper or synthetic paper. An edge portion (terminal portion) 10 of the superconducting cable conductor shows a multistage structure from which the cover is removed, as shown in FIG. 2. The multistage structure includes the central support 11, the superconducting layers 12, and the insulating layer 13 in this order from the end of the cable. The superconducting layers 12 consist of 4 layers, i.e., exposed superconducting layers 12a, 12b, 12c and 12d in the multistage structure as shown in FIG. 2.

A metal sleeve 30 (see FIGS. 3A to 3D) is fitted onto the exposed portions of the central support 11, the superconducting layers 12, and the insulating layer 13. The metal sleeve 30 includes a first cylindrical portion 31, a second cylindrical portion 32, and a third cylindrical portion 33, which are adjacent to each other at the end of each cylindrical portion. In this embodiment, the metal sleeve 30 also serves as a terminal member of a good conductor. The metal sleeve 30 may have a projection having a hole to ensure the connection to a good conductor such as elemental Cu, alloyed Cu, or alloyed Al, if required. The first cylindrical portion 31 has a hollow cylindrical shape with an internal diameter slightly larger than the diameter of the central support 11. The first cylindrical portion 31 of the metal sleeve 30 may be squeezed by an externally-applied force to be fixed over the exposed central support 11 by engagement or pressure bonding. For example, the compression of the first cylindrical portion 31 achieves close contact or fixation of the inner surface 31a to the central support 11.

The second cylindrical portion 32 of the metal sleeve 30 has an internal diameter larger than the diameter of the superconducting layers 12, defining a space a between the inner surface 32a of the second cylindrical portion 32 of the metal sleeve 30 and the superconducting layers 12. An opening 35 of the metal sleeve 30 extends through the second cylindrical portion 32. A molten solder as a low-melting-point metal can be poured through the opening 35 into the space between the inner surface 32a of the second cylindrical portion 32 and the superconducting layers 12, and can connect the superconducting tape, which forms the superconducting layers 12, with the metal sleeve 30 by soldering.

The solder spreading into the space between the inner surface 32a of the second cylindrical portion 32 and the superconducting layers 12 ensures excellent electrical connection between the superconducting layers 12 and the metal sleeve 30 with low connection resistance. In order to improve adhesiveness of the solder, the inner surface of the second cylindrical portion 32 or the entire inner surface of the metal sleeve 30, or the entire inner surface and outer surface of the metal sleeve 30 may be plated with Ag, Sn, or any solder material.

The third cylindrical portion 33 has a hollow cylindrical shape with an inner diameter slightly larger than the diameter of the insulating layer 13. This structure makes the insulating layer 13 restrained inside the third cylindrical portion 33 by the inner surface 33a. As a result, this portion does not bend but is kept straight even if a bending force is applied. The third cylindrical portion 33 may have an inner diameter which leaves a space between the inner surface 33a and the insulating layer 13. In such a case, the space is so small that the cable cannot be bent in the space. Alternatively, the third cylindrical portion may have an inner diameter large enough for the insulating layer 13 to be inserted thereinto, and the space between the third cylindrical portion 33 and the insulating layer 13 may be filled with an adhesive after the insertion, or the diameter of the third cylindrical portion 33 may be reduced so as to come into close contact with the insulating layer 13.

The length L of the third cylindrical portion 33 is set to at least 20 mm which corresponds to the width of an insulating paper forming the insulating layer 13. This is because, if the length L is less than the width of insulator paper, the paper may slip and come loose at the edge when a bending force is applied, which will preclude fixation of the insulating layer 13.

The metal sleeve 30 in the first embodiment has a three-stage structure with different inner diameters for respective stages. The first cylindrical portion 31 has the smallest inner diameter, which is slightly larger than the outer diameter of the central support 11 of the superconducting cable, so that the central support 11 can be inserted into the first cylindrical portion 31. The second cylindrical portion 32 adjacent to the first cylindrical portion 31 has an inner diameter large enough to leave a space between the second cylindrical portion 32 and the superconducting layers 12, which space can contain a required volume of solder. The third cylindrical portion 33 has the largest inner diameter, which is designed slightly larger than the outer diameter of the insulating layer 13 so that the insulating layer 13 of the superconducting cable can be inserted into the third cylindrical portion 33, with a tolerance for fitting it.

The terminal portion 10 which includes the central support 11, the superconducting layers 12, and the insulating layer 13, exposed in this order, is disposed in the metal sleeve 30. Then the first cylindrical portion 31 is pressed (compressed) from the periphery to reduce the diameter so that the metal sleeve 30 fits the central support 11. The second cylindrical portion is configured to contain molten solder which has been poured therein in order to connect all the superconducting tapes of the superconducting layers 12 with the metal sleeve 30 by soldering. The third cylindrical portion 33 is substantially in close contact with the insulating layer 13 of the superconducting cable.

According to the first embodiment, the metal sleeve 30 includes the third cylindrical portion 33 into which the insulating layer 13 is inserted. Since the insulating layer 13 and the third cylindrical portion 33 do not form a space therebetween or are in close contact with each other, flexure hardly arises between the insulating layer 13 and the third cylindrical portion 33; and the linear state is maintained when a bending force is applied to a terminal portion of the superconducting cable conductor. Thus no flexure occurs at the boundary between the superconducting layers 12 and the insulating layer 13 in this embodiment, whereas local flexure occurs at a boundary between exposed superconducting layers 12 and an insulating layer 13 of a conventional terminal. As a result, this portion does not suffer from damage, such as cutting of a wire, due to stress concentration or flexure of the superconducting layers 12. Thus the terminal structure is not only electrically reliable but also mechanically reliable in terms of tension and/or bending.

Figure 4A:
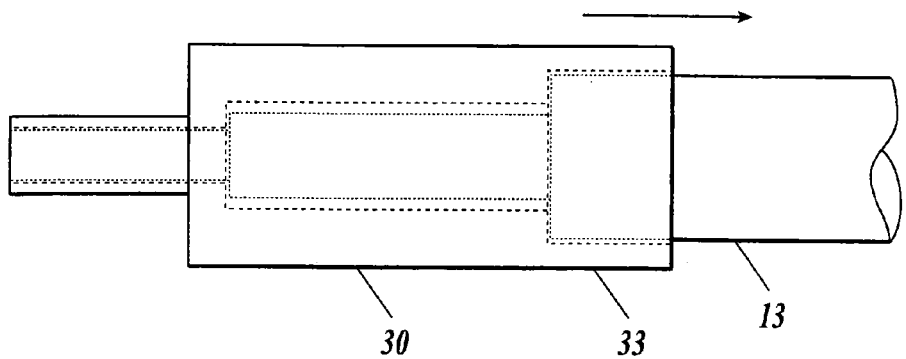
FIG. 4A illustrates a state of the metal sleeve that prevents a superconducting cable from being bent due to shrinkage of the cable according to the first embodiment of the present invention.

As shown in FIG. 4A, the above-described third cylindrical portion 33 of the metal sleeve 30 can hold the insulating layer 13 so as to prevent flexure between the metal sleeve 30 and the insulating layer 13 when the superconducting cable is subjected to a tensile stress. The tensile stress occurs when the superconducting cable shifts to an ultralow-temperature state which causes thermal shrinkage of the superconducting cable.

Figure 4B:
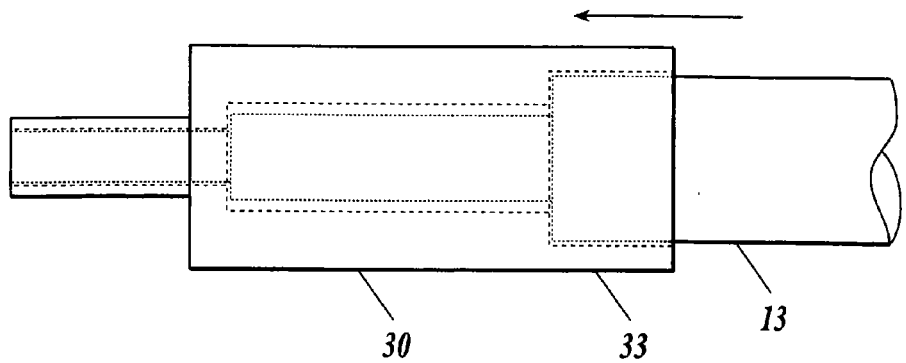
FIG. 4B illustrates a state of the metal sleeve that prevents the superconducting cable from being bent due to expansion of the cable according to the first embodiment of the present invention.
Figure 5A:
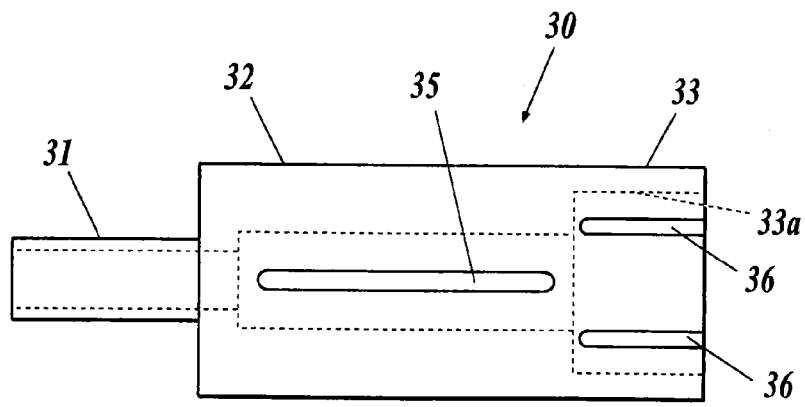
FIG. 5A is a plan view of a terminal member provided with a metal sleeve according to a second embodiment of the present invention.
Figure 5B:
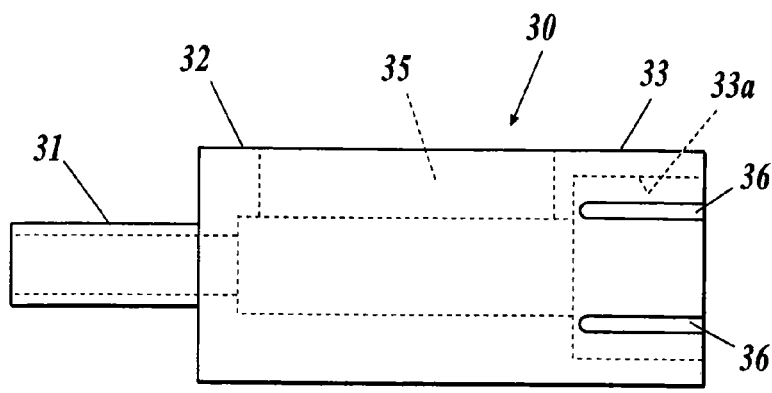
FIG. 5B is a side view of the terminal member provided with the metal sleeve according to the second embodiment of the present invention.
Figure 5C:
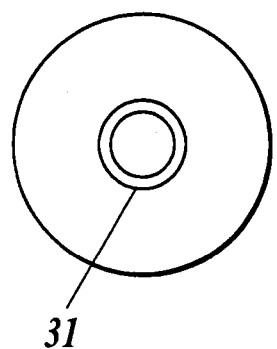
FIG. 5C is a left end view of the terminal member provided with the metal sleeve according to the second embodiment of the present invention.
Figure 5D:
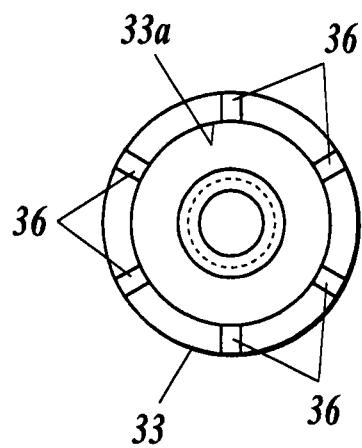
FIG. 5D is aright end view of the terminal member provided with the metal sleeve according to the second embodiment of the present invention.

Similarly, as shown in FIG. 4B, the third cylindrical portion 33 of the metal sleeve 30 can hold the insulating layer 13 so as to prevent local flexure between the metal sleeve 30 and the insulating layer 13 when the superconducting cable expands. The expansion of the superconducting cable occurs when shifting from an ultralow-temperature state to a normal-temperature state.

Accordingly, the metal sleeve 30 can provide a terminal structure which does not impair reliability under a significant change in temperature, both from an ultralow temperature to normal temperature; and from a normal temperature to ultralow temperature, in a heat cycle.

Second Embodiment

FIGS. 5A to 5D show a second embodiment of the present invention. A metal sleeve 30 includes a first cylindrical portion 31, a second cylindrical portion 32 and a third cylindrical portion 33, which are coaxially arrange and are adjacent to each other at the end of each cylindrical portion. The third cylindrical portion 33 has a plurality of longitudinal slits 36 arranged at intervals in the circumferential direction of the third cylindrical portion 33. These slits 36 extend longitudinally along the metal sleeve 30 over the entire length of the third cylindrical portion 33. This allows the third cylindrical portion 33 to have the properties of a spring which is compressive (or reduces in diameter) inwardly. Consequently, this structure makes it possible for the third cylindrical portion 33 to come into close contact with an insulating layer 13 without any adhesive or applied compression force.

More specifically, the diameter of the third cylindrical portion 33 is reduced, with the insulating layer 13 accommodated therein, so that the third cylindrical portion 33 comes into close contact with the insulating layer 13. Such a structure gives springiness to the third cylindrical portion 33 in the diameter direction, which achieves a firm contact of the inner surface 33a of the third cylindrical portion 33 with the insulating layer 13 without any adhesive or applied compressive force. Here, the inner diameter of the third cylindrical portion 33 is preferably set to be substantially equal to the outer diameter of the insulating layer 13. That is because the insulating layer 13 can be easily inserted into the third cylindrical portion 33 taking the advantage of the elasticity of the third cylindrical portion 33 brought about by the slits 36.

Third Embodiment

Figure 6:
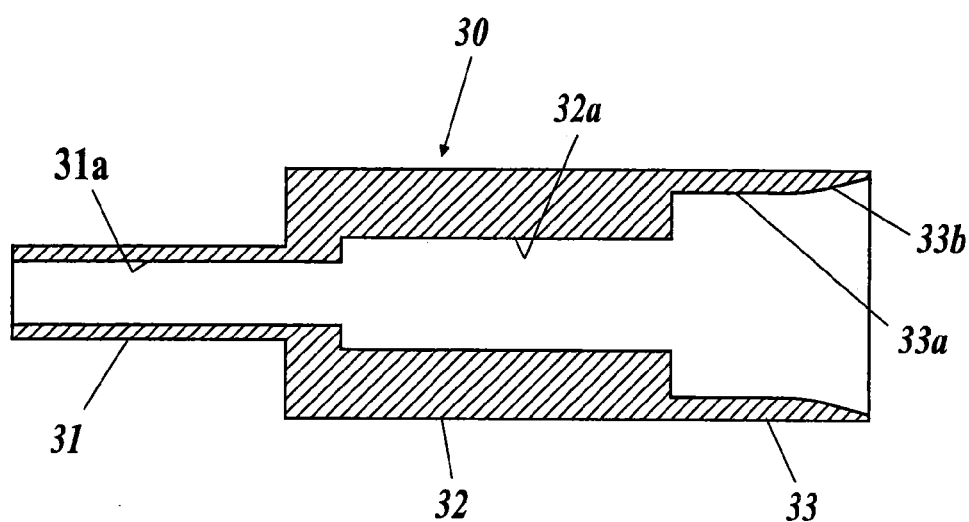
FIG. 6 is a sectional view of a terminal member provided with a metal sleeve according to a third embodiment of the present invention.
Figure 7:
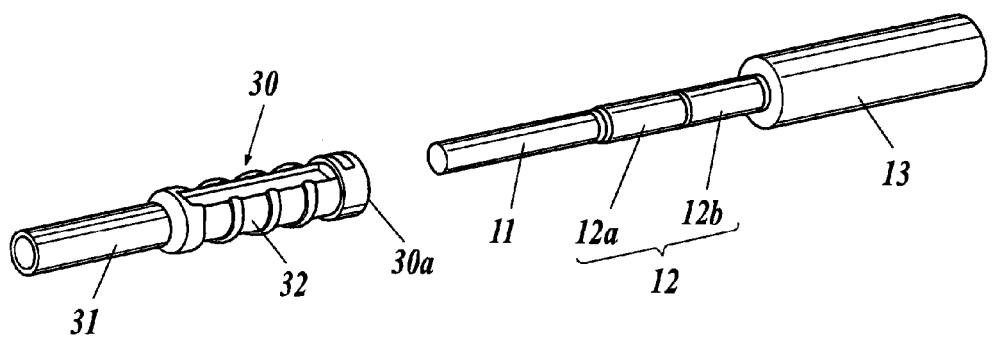
FIG. 7 is a perspective view of a terminal portion of a superconducting cable conductor and a metal sleeve according to conventional technology.
Figure 8:
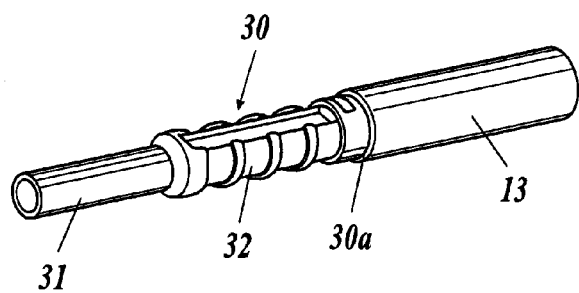
FIG. 8 is a perspective view of a conventional terminal structure of a superconducting cable conductor.
Figure 9A:
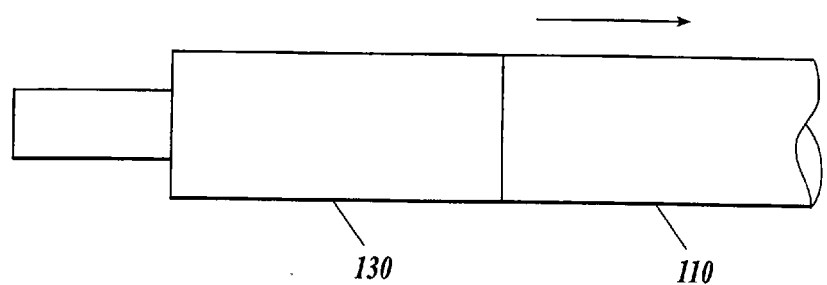
FIG. 9A illustrates a state of a conventional terminal structure of a superconducting cable conductor that prevents the superconducting cable from being bent due to shrinkage of the cable.
Figure 9B:
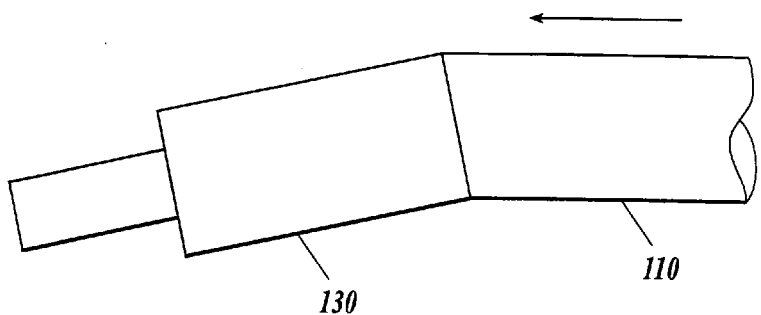
FIG. 9B illustrates a state of a conventional terminal structure of a superconducting cable conductor that is bent due to expansion of the cable.

FIG. 6 shows a third embodiment of the present invention. A metal sleeve 30 includes a first cylindrical portion 31, a second cylindrical portion 32 and a third cylindrical portion 33, which are coaxially arranged and are adjacent to each other at the end of each cylindrical portion. The third cylindrical portion 33 includes a curving portion 33b on a part of the inner surface 33a. The curving portion 33b has such a curvature as to allow a cable to bend gently when a bending force is applied to the cable. This structure of the inner surface 33a of the third cylindrical portion 33 can protect the superconducting layers 12 from damage because the cable bends gently along the entire inner surfaces 33a and 33b even if a bending force is applied to the cable.

In the embodiments described above, the metal sleeve also serves as a terminal member. Alternatively, the metal sleeve may be integrated with a projection having a hole to electrically connect to a good conductor such as, for example, elemental Cu, alloyed Cu, or alloyed Al, which are not superconductors.

The third cylindrical portion is provided with the slits 36 in the second embodiment, and provided with the curving portion 33b in the third embodiment. However, both of the slits 36 and the curving portion 33b may be provided in one embodiment.

INDUSTRIAL APPLICABILITY

The present invention is applicable to a technical field of connection between a superconducting cable and a conductor at a terminal or an intermediate connection point.

REFERENCE NUMERALS 10 conductor edge portion
10 terminal portion
11 central support
12 superconducting layer
12a first layer
12b second layer
12c third layer
12d fourth layer
13 insulating layer
30 metal sleeve
31 first cylindrical portion
31a inner surface
32 second cylindrical portion
32a inner surface
33 third cylindrical portion
33a inner surface
35 opening
36 slit
α space

The invention claimed is:

1. A connecting structure for connecting between a terminal portion of a superconducting cable conductor and a terminal member comprising a good conductor,
the terminal portion comprising:
a superconducting layer disposed on an outer periphery of a central support; and
an insulating layer surrounding the superconducting layer, wherein
the insulating layer and the superconducting layer are partially removed to expose the central support and the superconducting layer in this order from an end of the superconducting cable conductor,
the insulating layer comprises a wound insulating tape,
the wound insulating tape is formed by one of craft paper, semi-synthetic paper and synthetic paper; and
the terminal member comprising a metal sleeve covering the terminal portion, the metal sleeve comprising:
a first cylindrical portion whose inner surface is in close contact with an exposed portion of the central support;
a second cylindrical portion which is soldered around an exposed portion of the superconducting layer; and
a third cylindrical portion into which the insulating layer is inserted, wherein
the third cylindrical portion and a length equal to or greater than a width of the insulating tape has a diameter-increasing portion where an inner diameter gradually increases towards an edge of the third cylindrical portion, and
the diameter-increasing portion has a curvature allowing the superconducting cable conductor to bend gently when a bending force is applied to the superconducting cable conductor.

2. The connecting structure of the superconducting cable conductor according to claim 1, wherein
the third cylindrical portion has a slit structure; and
a diameter of the third cylindrical portion is reduced while the third cylindrical portion contains the insulating layer of the superconducting cable therein, so that the third cylindrical portion comes into close contact with the insulating layer.

3. The connecting structure of the superconducting cable conductor according to claim 1, wherein
the exposed portion of the superconducting layer comprises multiple sub-layers arranged in tiers in an order from an outermost sub-layer to an innermost sub-layer thereof.

4. The connecting structure of the superconducting cable conductor according to claim 1, wherein
the metal sleeve comprises at least one of elemental Cu, alloyed Cu, and alloyed Al.

5. A terminal member comprising a good conductor to be connected with a terminal portion of a superconducting cable conductor, the terminal member comprising:
a metal sleeve mounted on the terminal portion, the metal sleeve comprising a first cylindrical portion, a second cylindrical portion, and a third cylindrical portion which have different inner diameters, wherein
the first cylindrical portion has an inner diameter larger than an outer diameter of a central support of the superconducting cable conductor;
the second cylindrical portion has an inner diameter larger than an outer diameter of a superconducting layer disposed on an outer periphery of the central support;
the third cylindrical portion has an inner diameter larger than an outer diameter of an insulating layer surrounding the superconducting layer;
the insulating layer comprises a wound insulating tape;
a length of the third cylindrical portion is equal to or greater than a width of the insulating tape;
the wound insulating tape is formed by one of craft paper, semi-synthetic paper and synthetic paper;
the third cylindrical portion has a diameter-increasing portion where an inner diameter gradually increases towards an edge of the third cylindrical portion, and
the diameter-increasing portion has a curvature allowing the superconducting cable conductor to bend gently when a bending force is applied to the superconducting cable conductor.

6. The terminal member to be connected with the terminal portion of the superconducting cable conductor according to claim 5, wherein
the second cylindrical portion of the metal sleeve has an opening through which low-melting-point metal is poured into the second cylindrical portion.

* * * * *